US011586196B2

(12) United States Patent
Venkataramana et al.

(10) Patent No.: US 11,586,196 B2
(45) Date of Patent: Feb. 21, 2023

(54) APPROACH MODE ACTIVATION MONITORING FUNCTION AND AUTOMATIC ACTIVATION IN AN EVENT OF PILOT INCAPACITATION (71) Applicant: HONEYWELL INTERNATIONAL INC., Morris Plains, NJ (US)

(72) Inventors: Kiran Venkataramana, Bangalore (IN); Deepak Purushothaman, Bangalore (IN); Fiyaz Razack, Bangalore (IN); Shashikant Malshetty, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 188 days.

(21) Appl. No.: 17/004,503

(22) Filed: Aug. 27, 2020

(65) Prior Publication Data
US 2021/0221530 A1 Jul. 22, 2021

(30) Foreign Application Priority Data

Jan. 22, 2020 (IN) .............................. 202011002834

(51) Int. Cl.
G06F 3/0482 (2013.01)
B64D 43/00 (2006.01)
(Continued)

(52) U.S. Cl.
CPC ............. *G05D 1/00* (2013.01); *G05D 1/0061* (2013.01); *G05D 1/101* (2013.01); *G06F 3/0482* (2013.01)

(58) Field of Classification Search
CPC ........ G05D 1/00; G05D 1/0061; G05D 1/101; G05D 1/0676; G05D 1/0688;
(Continued)

(56) References Cited

U.S. PATENT DOCUMENTS 6,507,776 B1 1/2003 Fox, III
6,693,559 B1 2/2004 Gyde et al.
(Continued)

FOREIGN PATENT DOCUMENTS

WO 2017068335 A1 4/2017
WO 2017068570 A1 4/2017

OTHER PUBLICATIONS

Dautermann, Thomas, et al."Automatic Speed Profiling and Automatic Landings During Advanced RNP to xLS Flight Tests," 2017 IEEE/AIAA 36th Digital Avionics Systems Conference (DASC), IEEE, Sep. 17, 2017, pp. 1-10, XP033248934.
(Continued)

*Primary Examiner* — Anne Marie Antonucci
*Assistant Examiner* — Connor L Knight
(74) *Attorney, Agent, or Firm* — Lorenz & Kopf, LLP (57) ABSTRACT Aircraft systems and methods that determine, based on location data from a navigation system, whether conditions have been met enabling arming of an approach mode of an autopilot system. The systems and methods, when the one or more conditions enabling arming of the approach mode are determined to be met, start a first timer of a first period of time and, at the same time, provide a first message to alert a pilot to arm the approach mode via manual input to a user interface. When a determination has been made that the approach mode continues to have not been armed via manual input to the user interface, the approach mode is automatically armed.

14 Claims, 5 Drawing Sheets (51) Int. Cl.
*G05D 1/00* (2006.01)
*G05D 1/10* (2006.01)

(58) Field of Classification Search
CPC .............. G06F 3/0482; B64D 45/0031; B64D 45/0056; B64D 45/0059; B64D 2045/0085; B64C 13/18; B64C 2201/18
See application file for complete search history.

(56) References Cited

U.S. PATENT DOCUMENTS

| | | |
|---|---|---|
| 6,739,556 B1 | 5/2004 | Langston |
| 6,845,302 B2 | 1/2005 | Moretto |
| 6,917,863 B2 | 7/2005 | Matos |
| 6,995,688 B2 | 2/2006 | Reynolds |
| 7,098,810 B2 | 8/2006 | Bateman et al. |
| 7,099,752 B1 | 8/2006 | Lenell et al. |
| 7,183,946 B2 | 2/2007 | Boudrieau |
| 7,271,740 B2 | 9/2007 | Fischer |
| 7,624,943 B2 | 12/2009 | Cerchie et al. |
| 7,689,328 B2 | 3/2010 | Spinelli |
| 7,693,614 B2 | 4/2010 | Turung |
| 7,840,317 B2 | 11/2010 | Matos et al. |
| 8,052,096 B2 | 11/2011 | Cerchie et al. |
| 8,108,086 B2 | 1/2012 | Bailly |
| 8,164,464 B2 | 4/2012 | Matos |
| 8,521,340 B2 | 8/2013 | Coulmeau |
| 8,527,118 B2 | 9/2013 | Jones et al. |
| 8,761,965 B2 | 6/2014 | Righi et al. |
| 9,033,579 B2 | 5/2015 | Yoshino |
| 9,043,043 B1 | 5/2015 | Gribble et al. |
| 9,310,222 B1 | 4/2016 | Suiter et al. |
| 9,446,852 B2 | 9/2016 | Lacko et al. |
| 9,529,362 B1 | 12/2016 | Bhattacharyya et al. |
| 9,595,200 B2 | 3/2017 | Krogh et al. |
| 9,637,133 B1 * | 5/2017 | McCusker ............... A61B 5/18 |
| 9,645,582 B2 | 5/2017 | Shue |
| 9,646,505 B2 | 5/2017 | Ali et al. |
| 9,786,189 B2 | 10/2017 | Loussides et al. |
| 2009/0179114 A1 | 7/2009 | Conner |
| 2012/0116610 A1 * | 5/2012 | Righi ................... G05D 1/0061 244/76 R |
| 2012/0215384 A1 | 8/2012 | Fritz |
| 2013/0204470 A1 * | 8/2013 | Luckner ................ G08G 5/025 701/18 |
| 2014/0324255 A1 | 10/2014 | Siddiqi et al. |
| 2015/0123820 A1 | 5/2015 | Merle et al. |
| 2016/0240091 A1 | 8/2016 | Thiele et al. |
| 2017/0249852 A1 * | 8/2017 | Haskins ................ G01S 13/913 |
| 2017/0277185 A1 | 9/2017 | Duda et al. |
| 2017/0283038 A1 * | 10/2017 | Lin ......................... B64C 13/18 |
| 2018/0290729 A1 | 10/2018 | Shavit |
| 2018/0304993 A1 | 10/2018 | Offredi et al. |
| 2020/0184831 A1 * | 6/2020 | Bergeron ............. G08G 5/0052 |

OTHER PUBLICATIONS

Garcia, Juan Alberto Herreria, Safe Automatic Flight Back and Landing of Aircraft Flight Reconfiguration Function (FRF), 978-3-9810801-3-1/DATE08 © 2008 EDAA.

Y. Lim, A. Gardi, S. Ramasamy, R. Sabatini, "A Virtual Pilot Assistant System for Single Pilot Operations of Commercial Transport Aircraft", Australian International Aerospace Congress (AIAC17), pp. 139-145, Melbourne, Australia, Feb. 2017.

Schutte, Paul C., "The Naturalistic Flight Deck System: An Integrated System Concept for Improved Single-Pilot Operations," NASA/TM-2007-215090, Dec. 2007.

Fallast, Arno, et al. "Automated Trajectory Generation and Airport Selection for an Emergency Landing Procedure of a CS23 Aircraft," CEAS Aeronaut J (2017) 8:481-492, DOI 10.1007/s13272-017-0252-5, Jun. 30, 2017.

Siegel, Diana, "Development of an Autoland System for General Aviation Aircraft," Report No. ICAT-2011-09, Sep. 2011.

Faber, A., "Single Pilot Commercial Operations A Study of the Technical Hurdler," For obtaining the degree of Master of Science in Aerospace Engineering at Delft University of Technology, Aug. 16, 2013.

* cited by examiner

FIG. 7

APPROACH MODE ACTIVATION MONITORING FUNCTION AND AUTOMATIC ACTIVATION IN AN EVENT OF PILOT INCAPACITATION

CROSS REFERENCE TO RELATED APPLICATION

This application claims priority to Indian Provisional Patent Application No. 202011002834, filed Jan. 22, 2020, the entire content of which is incorporated by reference herein.

TECHNICAL FIELD

The present disclosure generally relates to systems and methods that arm an approach mode of an autopilot system of an aircraft. More particularly, the systems and methods described herein provide for prompting a pilot regarding arming the approach mode and arming the approach mode in the event of incorrect pilot response.

BACKGROUND

Per an IATA Safety Report, there are significant proportion of aircraft incidents when performing approach and landing. This safety report found that most of these incidents were due, at least in part, to pilot errors, SOP adherence/cross verification, intentional noncompliance, etc. (https://library online.erau.edu/online-full-text/iata-safety-reports/IATA-Safety-Report-2018.pdf).

Let us consider an example where a pilot has attempted to intercept the Final Approach segment by arming navigation mode of an autopilot system while trying to intercept the final approach path in heading mode of the autopilot system. Once the path is intercepted, navigation mode (LNAV) is engaged and a pilot is required to arm approach mode to capture ground-based localizer and guide slope system by pressing APPR button on a flight control unit (FCU) for performing a precision landing. Here, approach mode control is determined by pilot action. Should approach mode not be timely armed, an unstable landing approach could be conducted having a range of potential negative consequences.

Accordingly, an object of the present disclosure is to provide systems and methods relating to arming of the approach mode having one or more additional safety nets relating to timely activation of the approach mode. Another object of the present disclosure is to provide functionality to monitor for, and correct, erroneous or absent pilot response (which could be due to incapacitation, fatigue, high workloads inexperience in preparation of the landing etc.). Furthermore, other desirable features and characteristics of the disclosure will become apparent from the subsequent detailed description and the appended claims, taken in conjunction with the accompanying drawings and this background of the disclosure.

BRIEF SUMMARY

The present disclosure provides systems and methods having one or more additional safety nets in the event of incorrect pilot response relating to arming of an approach mode of an autopilot system during final approach and landing of an aircraft. In one embodiment, systems and methods for operating an aircraft, include receiving, via at least one processor, location data from a navigation system of the aircraft relating at least to aircraft location. The systems and methods include determining, via the at least one processor, based on the location data from the navigation system, whether one or more conditions have been met enabling arming of an approach mode of an autopilot system. When the one or more conditions enabling arming of the approach mode are determined to be met, at least one timer of at least one period of time is started and, at the same time, at least one message is provided, via an output system. The at least one message provides an alert to arm the approach mode via manual input to a user interface. The systems and methods include determining, via the at least one processor, whether the approach mode has been armed via manual input to the user interface within the at least one period of time. When the at least one period of time has expired and a determination is made that the approach mode has still not been armed, the approach mode is automatically armed. The systems and method include, when the approach mode is armed, capturing, via a landing system, localizer and guide slope system beams and changing, via the at least one processor, the approach mode from armed to engaged based at least on determining that the localizer and guide slope system beams have been captured. The landing system provides precision location data to the autopilot system based on the captured localizer and guide slope system beams. The autopilot system controls flying of a final approach course based on the precision location data when the approach mode is engaged. In embodiments, the at least one message includes a first message in the form of a scratchpad message or any other form of pilot alert. If the approach mode is not armed via manual input to the user interface within a first period of the at least one least period of time in response to the first message, then a second message of the at least one message is issued to alert the pilot and a second timer of the at least one timer begins to time a second period of the at least one period of timer. When the second time period expires and a determination is made that approach mode is still not armed via manual input to the user interface, then the approach mode is automatically armed.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure provides addition of one or more new safety nets in arming an approach mode of an autopilot system in an event when a pilot has not timely activated the approach mode. As described herein, the present disclosure provides for automatic activation mode arming if (and only if) a fault tolerant time has elapsed after the aircraft has converged to a final approach path (e.g. aircraft is within a specified course change with the final path or aircraft is fully aligned to an approaching runway) and a pilot has not manually activated approach mode arming.

Systems and methods described herein provide an approach mode arming monitoring function, which monitors for approach enable conditions and pilot action. Once the Approach enable conditions are met and the pilot has not armed for the approach (by pressing a corresponding approach mode button in a user interface), then systems and method described herein propose to implement the monitor function to watch out for the approach mode activation. In the event of no explicit activation and after waiting a specified fault tolerant period, systems and methods described herein alert the pilot (either Scratchpad, ECAM, callouts, etc.) for approach mode (APPR) activation. A second order defense is described by which automatic arming of approach mode is executed when there is no pilot response after a determined timer period. Further, systems and methods described herein provide an option for the pilot to manually disable automatic approach mode activation at any point of the flight by corresponding selection in a user interface.

In accordance with the present disclosure, therefore, systems and methods are provided by which approach mode activation by a pilot is actively monitored for a preset period from a determined time point when the system deems that approach mode can be activated. The systems and methods of the present disclosure alert the pilot concerning approach mode activation. When the preset period is expired and the pilot has still not manually activated the approach mode (through a user interface selection), then the approach mode of an autopilot system is automatically activated (i.e. without pilot activation through a user interface).

Figure 1:
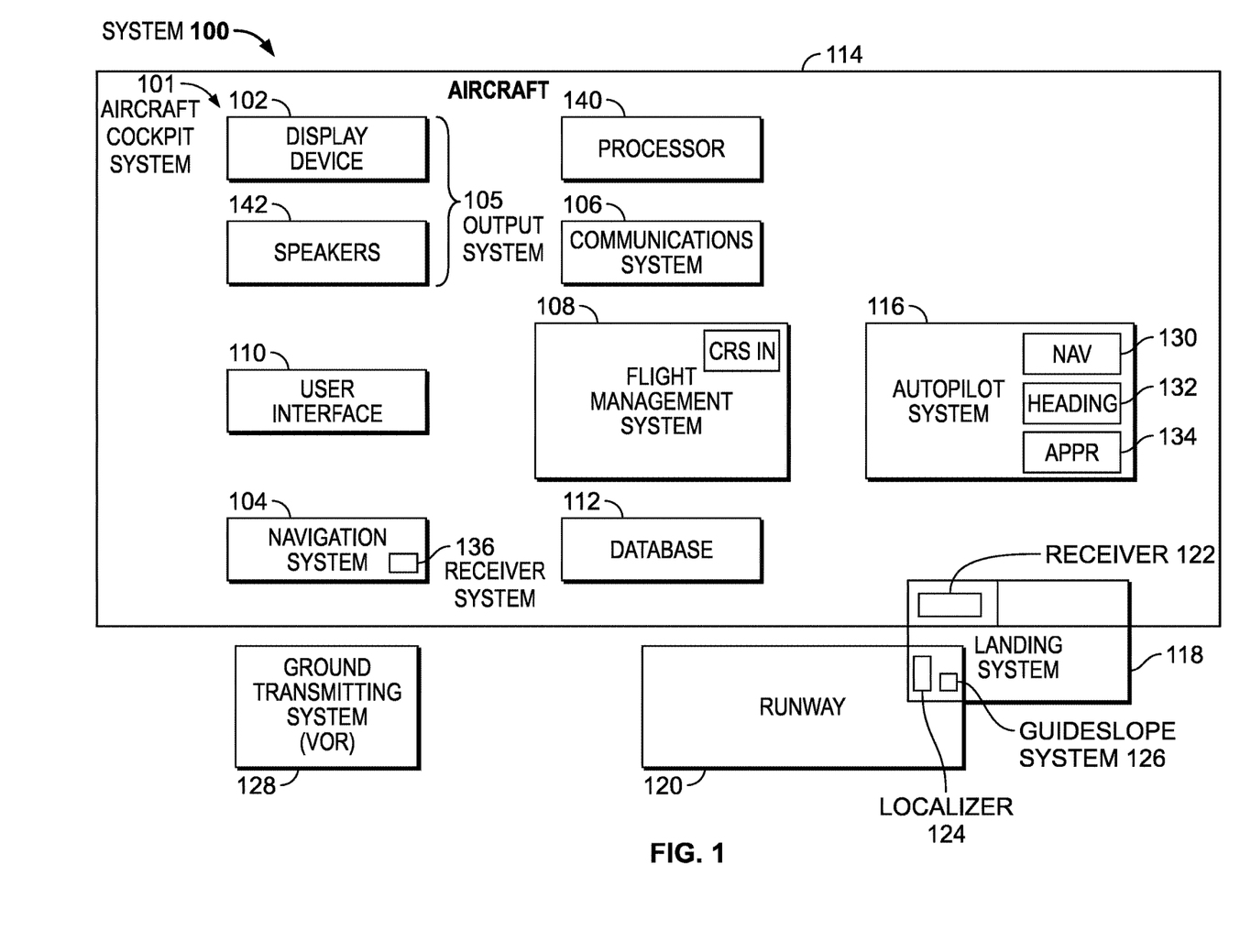
FIG. 1 is a schematic block diagram of a system for arming an approach mode of an autopilot system, in accordance with the present disclosure.

FIG. 1 depicts an exemplary embodiment of a system 100 for arming an approach mode of an autopilot system 116. The system 100 includes some components that are ground based (e.g. ground transmitting system 128) and an aircraft cockpit system 101, which may be located onboard aircraft 114. This embodiment of system 100 may include, without limitation, a display device 102, speakers 142, a navigation system 104, a communications system 106, an autopilot system 116, a landing system 118 and a flight management system 108. The system 100 further includes a user interface 110 for enabling interactivity with the system 100 and a database 112 suitably configured to support operation of the system 100, as described in greater detail below. It should be understood that FIG. 1 is a simplified representation of a system 100 for arming an approach mode for purposes of explanation and ease of description, and FIG. 1 is not intended to limit the application or scope of the subject matter in any way. In practice, the system 100 and/or aircraft 114 will include numerous other devices and components for providing additional functions and features, as will be appreciated in the art.

In an exemplary embodiment, the display device 102 is coupled to the flight management system 108, and the flight management system 108 is configured to display, render, or otherwise convey one or more graphical representations or images associated with operation of the aircraft 114 on the display device 102. Further, speakers 142 are provided to allow for audio output from the flight management system 108 and other systems. Speakers 142 and display device 102 provide an output system 105 for alerting a pilot in the cockpit of the aircraft 114 of activation of approach mode of the autopilot system 116. The flight management system 108 and the autopilot system are coupled to the navigation system 104 for obtaining real-time data and/or information regarding operation of the aircraft 114 to support operation of the flight management system 108 and the autopilot system 116. For example, sensed data from navigation system 104 can include geographical coordinates, altitude, and airspeed, among others. In embodiments, the navigation system 104 includes a receiver system 136 configured to receive beams transmitted from ground transmitting system (e.g. VOR) 128 and GPS satellite beams to assist navigation mode operation of the autopilot system 104. Further, landing system 118 includes a receiver 122 on an aircraft and localizer and guide slope transmitting systems 124, 126 to assist the autopilot system 116 in performing final approach to landing in an approach mode of the autopilot system 116.

In an exemplary embodiment, the user interface 110 is coupled to the flight management system 108, and the user interface 110 and the flight management system 108 are configured to allow a user to interact with the display device 102 and other elements of the system 100. In embodiments, the user interface 110 allows a pilot to select different modes of the autopilot system including heading, navigation and approach modes, as described in further detail below. The communications system 106 is coupled to the flight management system 108 and the autopilot system 116 and is configured to support communications between the aircraft 114 and another aircraft or ground location (e.g., air traffic control), as will be appreciated in the art. The communications system 106 is configured to transmit and receive signals on multiple discrete frequencies simultaneously and autonomously to support the operation of embodiments of the present disclosure.

In an exemplary embodiment, the display device 102 is realized as an electronic display configured to graphically display flight information or other data associated with operation of the aircraft 114 under control of the flight management system 108, as will be understood. In an exemplary embodiment, the display device 102 is located within a flight deck/cockpit of the aircraft 114. It will be appreciated that although FIG. 1 shows a single display device 102, this is figurative and, in practice, additional display devices may be present onboard the aircraft 114 and included within the term display device 102. In embodiments, approach mode alerts are output to the pilot through the display device 102. The user interface 110 may also be located within the cockpit of the aircraft 114 and is adapted to allow a user (e.g., pilot, co-pilot, or other aircrew member) to interact with the flight management system 108 and other systems, as described in greater detail below. In various embodiments, the user interface 110 may be realized as a keypad, touchpad, keyboard, mouse, touchscreen, joystick, microphone, or another suitable device adapted to receive input from a user. In embodiments described herein, approach mode can be armed through pressing a touchscreen button or other button on user interface 110.

In an exemplary embodiment, the navigation system 104 is configured to obtain one or more navigational parameters associated with operation of the aircraft 114. The navigation system 104 may be realized as a global positioning system (GPS), inertial reference system (IRS), or a radio-based navigation system (e.g., VHF omni-directional radio range (VOR) (e.g. ground transmitting system 128) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the current location of the aircraft 114 (e.g., with reference to a standardized geographical coordinate system) and the heading of the aircraft 114 (i.e., the direction the aircraft is traveling in relative to some reference) and providing these navigational parameters to the flight management system 108, for example. Landing system 118 is functionally related to navigation system 104 in that precise location data is provided based on lateral and vertical beams from runway localizers and guide slope systems 124, 126 and received by receiver 122. Autopilot system 116 is configured to utilize the precise location data from landing system 118 in tracking a final approach course when in approach mode. Autopilot system 116 is further configured to track a radial path defined by radials in navigation mode using location data from the navigation system. Generally, the precision of tracking in navigation mode is lower than that in approach mode of the autopilot system 116.

In an exemplary embodiment, the communications system 106 is configured to support communications between the aircraft 114 and another aircraft or ground location (e.g., air traffic control). In this regard, the communications system 106 may be realized using a radio communication system or another suitable data link system. In accordance with one embodiment, the communications system 106 includes multiple radios configured to be tuned for an identified radio communication frequency, as will be appreciated in the art.

In an exemplary embodiment, the flight management system 108 (or, alternatively, a flight management computer) is located onboard the aircraft 114. Although FIG. 1 is a simplified representation of display system 100, in practice, the flight management system 108 may be coupled to one or more additional modules or components as necessary to support navigation, flight planning, and other aircraft control functions in a conventional manner. In addition, the flight management system 108 may include or otherwise access a terrain database, navigational database (that includes airport diagrams, STAR, SID, and en route procedures, for example), geopolitical database, taxi database, or other information for rendering a navigational map or other content on the display device 102, as described below. In this regard, the navigational map may be based on one or more airport diagrams, sectional charts, topographic maps, digital maps, or any other suitable commercial or military database or map, as will be appreciated in the art.

In an exemplary embodiment, the flight management system 108 accesses or includes a database 112 that contains procedure information for a plurality of airports. Procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport. In embodiments, the database 112 includes runway data describing final approach courses (lateral and vertical) to various runways, aircraft operating limitations for landings at different airports and runway (e.g. maximum speed and energy levels) and other prescribed information required by embodiments of the present disclosure described further below.

Autopilot system 116 is configured to automate tasks, such as maintaining an altitude, climbing or descending to an assigned altitude, turning to and maintaining an assigned heading, intercepting a course, guiding the aircraft between waypoints that make up a route programmed into the flight management system 108, and flying a precision approach using landing system 118 or flying a non-precision approach. The autopilot system 116 includes servo actuators that control movement and control circuits to make the servo actuators move the correct amount for the selected task. The autopilot system 116 includes a flight director (FD) component. The FD is computer processing and programming of the autopilot system 116 to provide the various functions of the autopilot system 116 including those described herein. Most autopilot systems 116 can fly straight and level. When there are additional tasks of finding a selected course (intercepting), changing altitudes, and tracking navigation sources with cross winds, higher level calculations are required. The FD is designed with the computational power to accomplish these tasks and usually displays the indications to the pilot for guidance as well. In accordance with various embodiments, include navigation NAV 130, HEADING 132 and APPR 134 computer modules that are implemented through one or more processors and corresponding computer program instructions stored on non-transitory memory for implementing navigation, heading and approach modes, which are described in greater detail below.

System 100 further includes one or more processors 140 that are configured to execute computer programming instructions stored on non-transitory memory (not shown). Functions of the system 100 and steps of method 200 (FIG. 2) are executed by one or more processors 140 and the associated computer programming instructions. The one or more processors 140 and software can be included as any part of aircraft cockpit system 101 and any of the subsystems such as autopilot system 116 and flight management system 108 and combinations thereof.

Figure 2:
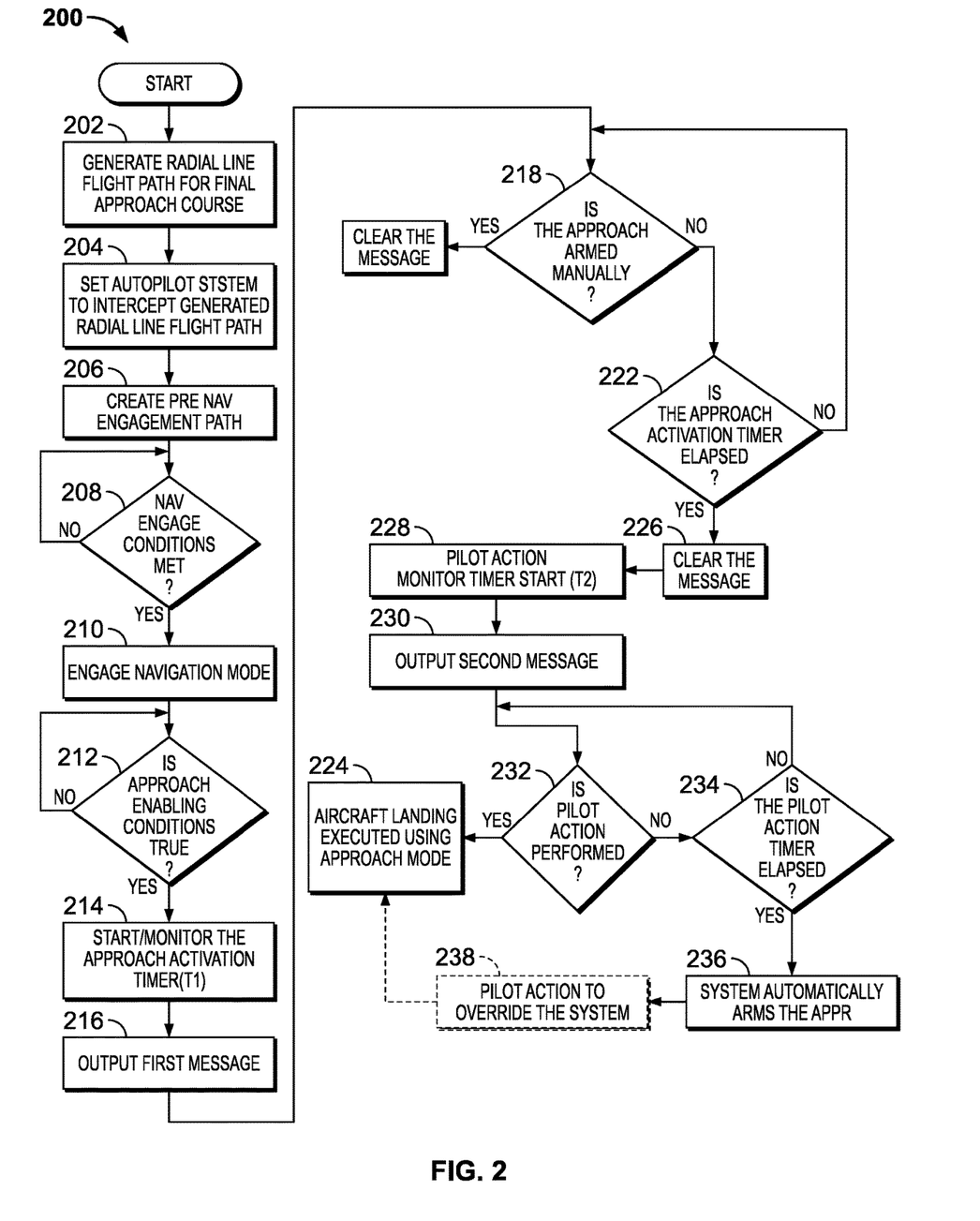
FIG. 2 is a flowchart of a method for arming an approach mode of an autopilot system, in accordance with the present disclosure.

FIG. 2 is a flowchart illustrating an exemplary method 200 for automatically arming an approach mode of an aircraft 114, in accordance with various embodiments. Steps of method 200 are performed by the computer processor 140 (FIG. 1) executing computer programming instructions. The computer processor 140 and associated programming instructions can be part of the flight management system 108, the autopilot system 116, a flight control unit (not shown) or any other system of the aircraft 114 or a combination thereof in a distributed processing architecture. The flowchart of FIG. 2 will be described in conjunction with the exemplary flight path and aircraft operations of FIGS. 3 to 7.

Figure 3:
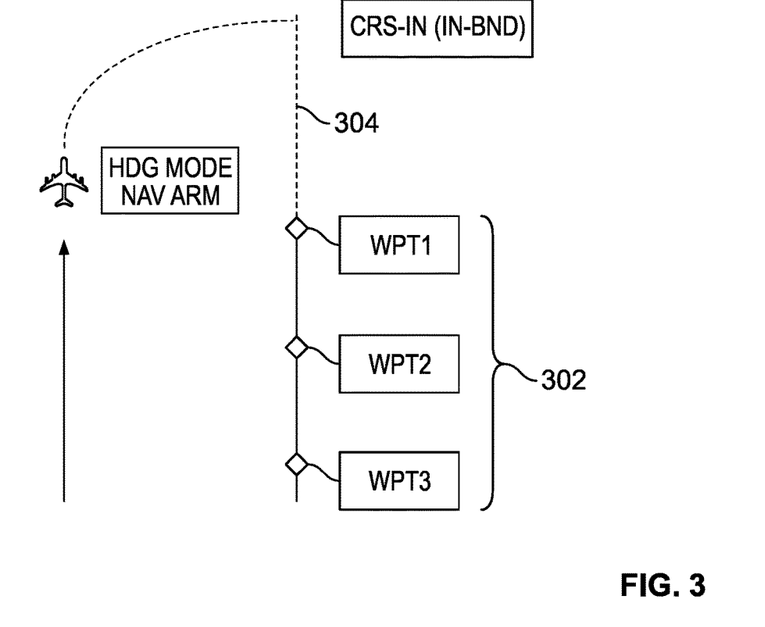
FIGS. 3 to 7 provides an example flight path and aircraft operation, in accordance with the present disclosure.

In step 202, and with additional reference to FIG. 3, the flight management system 108 generates a radial line flight path 304 to a final approach course 302 comprising one or more final approach waypoints (WPT1, WPT2, WPT3, etc.). Final approach courses are defined for runways of airports operating landing systems and corresponding final approach course data is included in the database 112. The final approach course 302 is often a straight-line final approach in alignment with a runway to which the aircraft 114 is headed for landing.

The final approach course 302 has stringent airspace requirements. One example airspace containment requirement is defined in DO-236-MASPS (Required Navigation Performance). The final approach course 302 is defined by final approach course data 302 from database 112 having precise vertical and lateral specifications for the approach of the aircraft 114. The aircraft 114 is configured to operate in full managed mode of the autopilot system 116 along the final approach course 302. In order to navigate such tightly constrained airspace, and as shown in FIG. 1, the aircraft 114 and the airport has a landing System 118 including transmitters on the ground and receivers on the aircraft 114. A ground-based transmitter system providing lateral guidance beams is referred to as a localizer 124 and a ground-based transmitter system providing vertical guidance beams is referred to as guide slope system 126. Generally, the localizer 124 and the guide slope system 126 are installed at the end of the runway 120. The aircraft 114 is to be steered to capture and control the localizer and guide slope beams to make a safe landing to the runway 120. The aircraft 114 has a receiver 122 and computer processing capability in the aircraft side of the landing system 118 to receive and interpret the beams of the localizer 124 and guide slope system 126 and to generate precision location data for use (as described further below) by systems of the aircraft 114 to follow the narrowly defined vertical and lateral final approach course 302.

Figure 5:
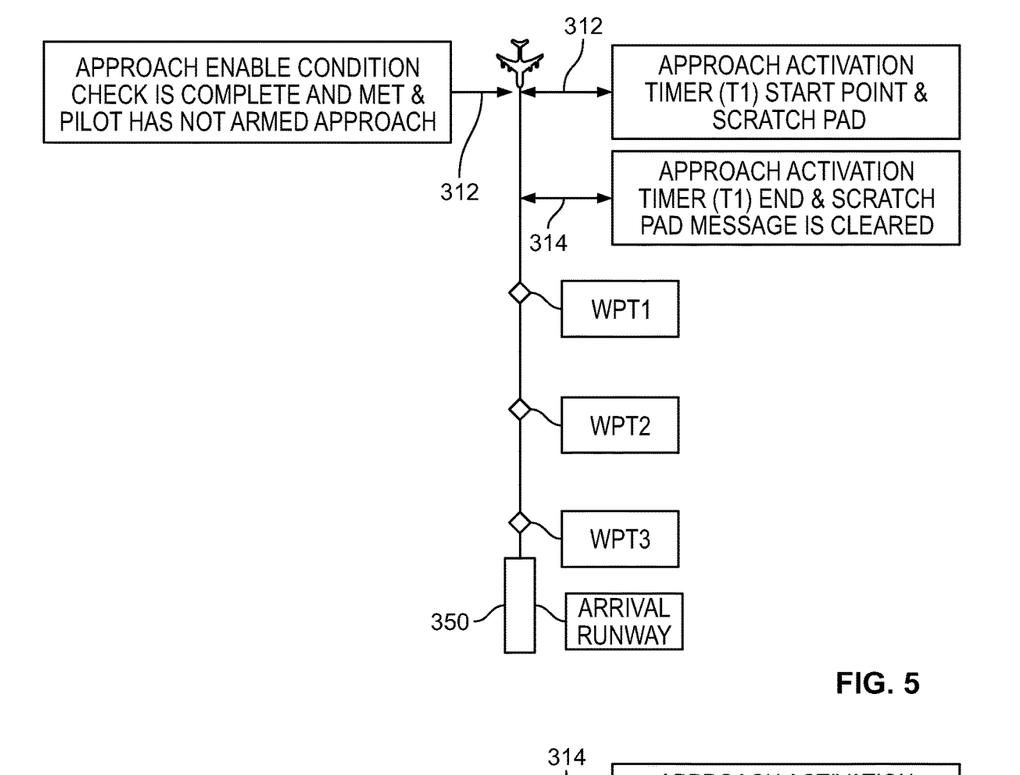

In embodiments of step 202, the flight management system 108 receives final approach flight course data from the database 112 including waypoint data for WPT1, WPT2, WPT3 making up the final approach course 302 for a target runway 350 (FIG. 5). The flight management system 108 is configured to draw the radial line flight path 304 from the first waypoint WPT1 of the final approach course 302 that will be intercepted during a final approach of the aircraft 114. The radial line flight path 304 is drawn in an opposite direction to the other waypoints WPT2, WPT3 of the final approach course 302. The flight management system 108 includes a CRS IN computer module that is configured to receive a fix (e.g. pilot selected) or waypoint (e.g. WPT1) and to receive an input angle (e.g. pilot selected) and draw a vector from the selected waypoint at the selected angle. The vector generated by the flight management system 108 corresponds to the radial line flight path 304. According to the CRS IN computer module, an operation is performed by the flight management system 108 to draw the radial line flight path 304 in alignment to a target runway for final approach legs. On performing this operation, a corresponding message (e.g. "IN-BND" is displayed on a map) will be displayed through the display device 102 to alert the pilot that a radial line flight path 304 has been generated and is available for interception. The aircraft 114 is thus vectored to the final approach course 302.

The radial line flight path 304 is a laterally and vertically defined route specified by Very High Frequency (VHF) Omni-Directional Range VOR or other radials that reference beams transmitted from the ground transmitting system 128. In other embodiments, Global Positioning System referenced radials are utilized to define the radial line flight path 304 or a combination of ground based and satellite-based area navigation (RNAV). When engaged, a navigation mode of the autopilot system 116 is configured to accurately track the aircraft 114 along the radial line flight path 304.

In accordance with various embodiments, method 200 includes step 204 of setting the autopilot system 116 to intercept the generated radial line flight path 304. In embodiments, the autopilot system 116 includes NAV and HEADING computer modules 130, 132 for executing navigation and heading modes thereof. Respective navigation and heading mode buttons (e.g. graphical or mechanical) are included in the user interface 110 for arming and engaging the corresponding modes of the autopilot system 116. The autopilot system 116 is configured to receive radial line flight path data and a command (e.g. pilot selected) to engage the radial line flight path 304. In embodiments, the command to engage the radial line flight path is set by the pilot through the user interface 110 (e.g. pressing on a heading dial).

In embodiments, method 200 includes step 206 of creating a pre-nav engagement path 308 (FIG. 2). The flight management system 108 is configured to be responsive to the command to intercept the radial line flight path 304, from step 204, and to create additional vectors defining the pre-nav engagement path 308. The pre nav engagement path 308 is a representational vector drawn from the aircraft 114 (e.g. the nose of the aircraft 114) to the radial line flight path 304 and is displayed through the display device 102. The autopilot system 116 is configured to fly the aircraft 114 in heading mode to follow the pre-nav engagement path 308.

In accordance with various embodiments, method 200 includes step 208 of the flight management system 108 or the autopilot system 116 determining whether navigation mode engagement conditions are met. An exemplary navigation mode engagement condition includes a minimum distance from the aircraft 114 to intercepting the radial line path 304 (the aircraft 114 must be sufficiently close to interception). Other navigation mode engagement conditions may be required such as the pre-nav engagement path 308 having been created that intercepts with the radial line path 304 and/or navigation data from sensors (e.g. Line Replaceable Units LRUs) from navigation system 104 having been checked for validity. For example, sensor data such as GPS, IRS, air data systems, etc from navigation system 104 is checked as valid (e.g. the corresponding sensor being in working order) as one of the possible conditions to be assessed in step 208. When the aircraft 114 is determined to meet the navigation mode engagement conditions (e.g. the aircraft 114 is sufficiently close to intercepting the radial line flight path 304), then the heading mode of the autopilot system 116 is disengaged and the navigation mode of the autopilot system 116 is engaged.

In accordance with various embodiments, method 200 includes step 210 of engaging the navigation mode. Navigation mode of the autopilot system 116 is configured to fly the aircraft 114 so as to track radials of the radial line flight path 304. The autopilot system 116 and the flight management system 108 operate together in the engaged navigation mode (which includes engages lateral and vertical navigation computer modules) to control the flight path of the aircraft 114 along lateral and vertical margins defined by the radial line flight path 304. Navigation mode utilizes navigation data from navigation system 104, particular from receiver system 136. Receiver system 136 is configured to receive GPS satellite signals and/or beams from ground transmitting system 128 to generate aircraft location data for use by the navigation mode to track the radial line flight path 304.

In embodiments of method 200, step 212 is included by which the computer processor 140 determines whether approach mode enabling conditions are true. When the approach mode enabling conditions are satisfied a first timer T1 is started by the computer processor 140. The first timer T1 is used as part of a process for automatically arming the approach mode, providing an important safety feature in the event of pilot error or incapacitation during a final region of landing, in accordance with the present disclosure.

Approach mode of the autopilot system 116 is similar to the navigation mode described previously, but flies the selected course (in this case the final approach course 302) with a higher degree of precision necessary for approaches executed using the landing system 118 and allows glideslope tracking in the vertical dimension. The approach mode is included as a computer module APPR 134 in the autopilot system 116. When the approach mode is armed and the beams from the localizer 124 and glideslope system 126 have been captured by the landing system 118 using the receiver 122 of the aircraft 114, the approach mode can be engaged to allow a precision approach landing of the aircraft 114. The landing system 118 provides precise vertical and lateral location data based on the beams from the localizer 124 and the glideslope system 126, which is used by the autopilot system 116 in conjunction with constrained three-dimensional airspace data defined by the final approach course 302 to execute a precision final approach.

Aircraft system 100 of FIG. 1 includes a button (graphical or mechanical button) in the user interface 110 that allows a pilot to arm and engage the approach mode of the autopilot system 116. However, aircraft system 100 also includes a mechanism for automatically arming approach mode when a monitored time has elapsed from when a determination is made in step 212 that approach mode enabling conditions have been met. The autopilot system 116 accesses flight procedure data from the database 112 associated with the final approach course for the target runway providing low energy and low speed/nominal speed guidelines and ensures corresponding flight controls are automatically commanded to support approach mode landing, using the landing system 118, when the approach mode is armed.

Referring back to step 212 of method 200 of FIG. 2, there are various possible approach mode enabling conditions. A first example approach mode enabling condition is that the aircraft 114 is either within the final approach region or on the final approach segment. Final approach regions or segments are identified in flight plan data from the database 112. Accordingly, the first example approach mode enabling condition can be assessed by comparing current location of the aircraft 114, which is available from navigation data from navigation system 104, with identified final approach segment or final approach region taken from flight plan data. In further detail, final approach regions or segments are listed in approach charts for pilot aid to ensure that appropriate speeds and altitudes are maintained in support of landing. Accordingly, final approach regions or segments will be coded in the flight plan procedure in the automated systems of the aircraft 114 where this information ensures that low energy levels are maintained by aircraft 114 to support safe stabilized landings.

In a second example approach mode enabling condition, the aircraft 114 is aligned to the runway or it is within a predetermined angle of course change (such as 15°). The predetermined angle (e.g. 15°) is a threshold to ensure that the aircraft 114 is determined to be sufficiently aligned to the target runway centerline. If aircraft alignment is outside this range, then arming of the approach mode using landing system 118 cannot be performed. Course change represents the delta difference between the aircraft heading and runway heading. In embodiments, the second example approach mode enabling condition is assessed by the computer processor 140 comparing data representing a heading of the aircraft, which is available from navigation system 104, and data representing a direction of extension (or heading) of the target runway, which is available from database 112.

In a third example approach mode enabling condition, validity of aircraft state conditions is confirmed such as airspeed and inertial vertical speed being greater than 0 ft/min, inertial flight path angle is valid, etc. The data to be assessed for validity can come from various sensors like IRS/GPS, air data computer, inertial systems, altimeter, etc. This validity assessment ensures that sensors of the navigation system 104 are operating correctly In a fourth example approach mode enabling condition, the computer processor 140 checks that thrust mode has not changed to TOGA (Take and Go Around) or missed approach has not been activated. Thrust mode represents high thrust required for engines to make an aircraft climb and would be indicative of TOGA, which is a thrust mode used for executing missed approach to go around from the airport in the case pilot does not make safe landing due to traffic, poor visibility, etc.

In a fifth example approach mode enabling condition, the computer processor 140 checks that a valid approach has been selected that is compatible with approach mode using landing system 118. If the approach is defined in the flight plan available to the flight management system 108, then it would be deemed valid. A pilot can choose from Instrument Landing System (ILS) approach or GPS approach or NDB (Non directional beacon) approach. Here, ILS and GPS approaches are valid approaches as they can result in precision approach landing in which approach mode is activated and beams of landing system 118 are captured to transition from managed flight management system mode to instrument landing system mode. NDB approach if selected is not a valid approach mode for approach mode landing using landing system 118.

In some embodiments, all of first to fifth approach mode enabling conditions are required to be satisfied for step 212 of method 200 to be parsed. In other embodiments, only one or some of these first to fifth approach mode enabling conditions must be satisfied. As such, any combination of these first to fifth approach mode enabling conditions can be included in the assessment of step 212. Primarily, the first and/or second approach mode enabling conditions are included in step 212. The approach mode enabling conditions serve the purpose of enabling the computer system 140 to determine an early point during final approach and landing that approach mode of the autopilot system 116 could be activated in a way that is compatible with progress of flight of the aircraft 114 and compatible with aircraft systems.

When step 212 results in a determination that the approach mode enabling conditions have been satisfied, the first timer T1 is started in step 214. Otherwise, step 212 is intermittently repeated until the aircraft 114 is sufficiently in line with the target runway and the aircraft 114 is flying in the final approach segment and any other conditions have been met. This repetition of step 212 provides for an active monitoring of a time when approach mode can feasibly be armed.

First timer T1 represents an amount of time controlled by the computer processor 140 from the approach mode enabling conditions being satisfied in step 212 to when a first message is output to the pilot through the display device 102 and/or the speakers 142 in step 216. The first message prompts selection of the approach mode button through the user interface 110. The length of time of first timer T1 is selected so as not to be so short as to be a nuisance prompt to the pilot but not to be so long as to not allow for a further prompting step and automatic arming of the approach mode within sufficient time to still provide for safe precision landing. In embodiments, when first timer T1 expires without approach mode being armed through corresponding input at the user interface, step 216 is executed by which the display device 102 and/or the speakers 142 output a call out/message/warning to activate the approach mode. In one example, step 216 includes outputting a first message on a scratch pad of the display device 102 alerting the pilot to arm the approach mode using the user interface 110. In other embodiments, the first message is output through an Electronic Centralized Aircraft Monitor (ECAM) system, callouts, CDS/INAV system (Cockpit Display System/Integrated Navigation system), etc.

In accordance with various embodiments, method 200 includes step 218 of determining whether the approach mode has been armed manually. That is, computer processor 140 monitors for pilot inputting approach mode activation through the user interface 110 (e.g. by selecting approach mode activation button). When the approach mode has been armed by the pilot, the output first message of step 216 is cleared/stopped in step 222 and the aircraft landing is executed using the approach mode of the autopilot system 116 in step 224 (which will be described further below). When the approach mode has not been armed by the pilot, the computer processer 140 determines whether first timer T1 has elapsed in step 222. If the first timer T1 has not yet elapsed, the computer processor 140 continues to monitor for manual approach mode arming through step 218. Accordingly, an active monitoring function for pilot activation of approach mode is provided.

If the first timer T1 has elapsed according to step 222, the first message of step 216 is cleared in step 226 and a second timer T2 is started/monitored in step 228. At the same time as step 228, a second message is output in step 230. In embodiments, the second timer T2 denotes the wait duration from a time point where the pilot is alerted with the second message to arm the approach mode until the proposed system automatically arms the approach mode if the pilot does not arm the approach mode during the second timer T2 period. Timer T2 is set in duration so as to provide sufficient time to respond to the prompt offered by the second message, yet not be so long as to endanger safe automatic arming of the approach mode having regard to the distance to the final approach course 302.

In accordance with various embodiments, the computer processor 140 uses predetermined time values for timers T1 and T2 that have been determined empirically and apply irrespective of the runaway and airport. In other embodiments, the time values for timers T1 and T2 are retrieved from the database 112 and can vary from airport to airport and runway to runway. In other embodiments, the computer processors 140 is configured to dynamically determine values for timers T1 and T2 based on estimated time to interception of the final approach course 302 as at least one input variable. In the present embodiment, two timers T1 and T2 are used and two output messages are provided. In other envisaged embodiments, just one timer and just one output message could be provided. Likewise, more than two timers and output messages could be implemented.

In embodiments, the second output message of step 230 provides the pilot with the options to either accept or reject arming of approach mode. In one example, two graphical buttons are displayed through display device 102 that are selectable through user interface 110 representative of accept or reject options. In some embodiments, the second message appears on CDS/INAV system (Cockpit Display System/Integrated Navigation system) or in a MCDU/MFD (Multi Control Display Unit/Multi function display) prompt. In some embodiments, the first and second messages differ from each other in content and in delivery medium. Thus, in one example, the first message is displayed on a scratchpad and the second message is displayed on an MCDU/MFD. Further, the first message is a reminder to take action in its content without an additional actionable button, whereas the second message comes with at least one actionable button to accept or reject arming of the approach mode.

In accordance with various embodiments, method 200 includes a step 232 of the computer processor 140 determining whether pilot action has been taken, where the pilot action is to arm the approach mode through the user interface 110 by selecting the accept button of the second message in step 230 or by selecting the usual approach mode button that is available as an output of the flight management system 108. When the determination of step 232 is that the approach mode has been manually armed, the method proceeds to step 224 of landing the aircraft using the approach mode. When the determination of step 232 is that the approach has not been manually armed, the method proceeds to step 234 to determine whether the second timer T2 has expired. When the timer T2 has not yet expired, step 232 is repeated. In this way, manual arming of the approach mode is actively monitored for the duration of timer T2.

When the timer T2 has expired and the approach mode has still not been armed by the pilot through user interface 110, the computer processor 140 automatically arms the approach mode without corresponding pilot action through the user interface 110. In this way, the systems and methods of the present disclosure monitor whether approach mode has been armed in sufficient time ahead of the approach segment, provides effective alerts and prompts to a pilot and automatically arms the approach mode when pilot action is not timely forthcoming. The systems and methods described herein thus insure against incorrect pilot response (which could be due to incapacitation, fatigue, high workloads inexperience in preparation of the landing, etc) with regard to arming the approach mode.

In accordance with various embodiments, provision is made for the pilot to disable automatic approach mode through user interface 110 after step 236. Thus, in step 238, the computer processor 140 is responsive to pilot input through user interface to disarm the approach mode and override the automatic arming of step 236.

In accordance with various embodiments, step 224 includes the aircraft landing being executed using the approach mode of the autopilot system 116. In more detail, the approach mode is initially armed, but not yet engaged. Engagement of the approach mode requires the computer processor 140 to assess conditions as to whether approach mode can be engaged. In particular, the aircraft 114 should be flying at low energy and low speeds, which can be determined based on guidelines available to the computer processor through the database 112 and corresponding sensor values available through the navigation system 104. Further, a determination should be made that the landing system 118 has captured the beams of the localizer 124 and the guide slope system 126. The lateral and vertical beams of the landing system 118 are captured when the aircraft 114, specifically the receiver 112 thereof, is sufficiently close to the lateral and vertical beams. In some examples, a tolerance for the capture of the lateral and vertical beams will be less than a nautical mile for lateral capture and less than a few hundred feet for vertical capture. Other assessed conditions for transitioning from the approach mode armed condition to the approach mode engaged condition include the aircraft 114 being aligned to the target runway centerline, the aircraft 114 being neither above altitude for descent nor below altitude for descent, all required sensors like airspeed, altimeter, position source are working, etc. When the approach mode of the autopilot system 116 is engaged, precise location data from the landing system 118 (as derived from the ground-based localizer 124 and guide slope system 126) is used to track tight tolerances of the precision landing course set by vertical and lateral constraints of the final approach course 302.

Steps of the method of FIG. 2 will be further illustrated with reference to example flight path and aircraft operations set out in FIGS. 3 to 7 in which a pilot does not manually arm the approach mode within the allotted time defined by timers T1 and T2. In the non-limiting example of FIG. 3, the flight management system 108 has, according to step 202 of FIG. 2, generated the radial line flight path 304 using the CRS IN function (or DIR TO COURSE IN) and has drawn a vector at a selected angle that is aligned with a target runway and which extends from a selected waypoint (WPT1 in this example). In embodiments, the pilot selects the CRS IN, the way point and the angle through the user interface 110 associated with the flight management system 108. A message (e.g. IN-BND) is displayed on map displays when the radial line flight path 304 has been generated.

Figure 4:
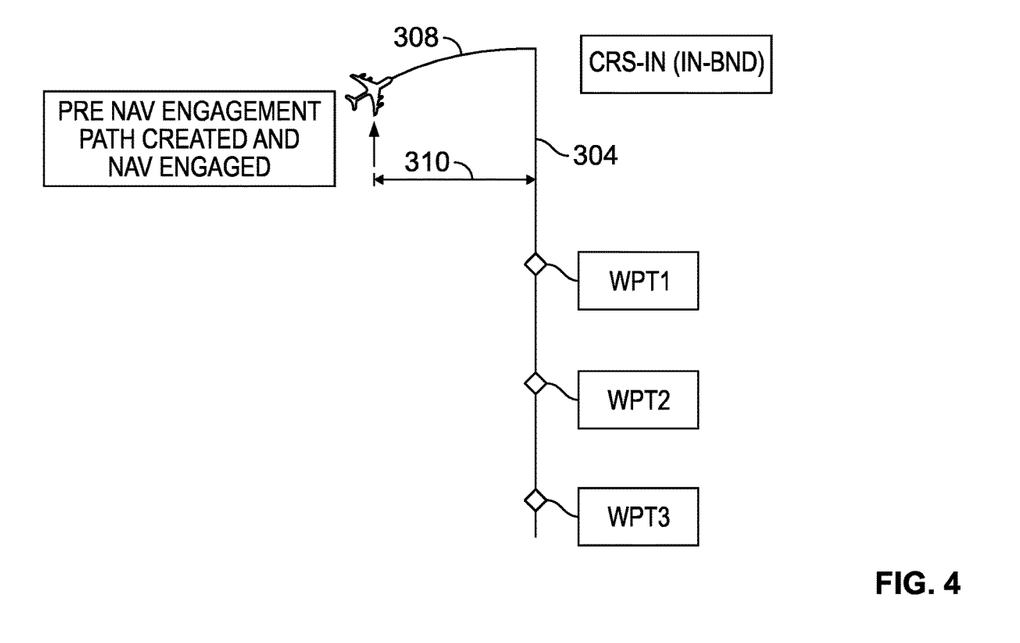

With reference to FIG. 4, and in embodiments of steps 204 and 206, a pilot selects an autopilot heading of the autopilot system 116 in a heading mode of the autopilot system 116 to steer the aircraft 114 toward the radial line flight path 304 to intercept the drawn vector. In other embodiments, automatic radial line interception is selected by the pilot and aircraft heading is computed through the flight management system 108 for execution by the autopilot system 116. In one example, the pilot dials a heading knob of the user interface 110 to intercept the vector defined by the radial line flight path 304 by pressing the heading knob. In this way, the autopilot system is set to intercept the generated radial flight line path 304 as per step 204. The autopilot system 116 is thus placed in the heading mode with the navigation mode armed. Responsive to step 204 being executed, the flight management system 108 constructs the pre-nav engagement path 308 (per step 204) when the navigation mode is armed but not engaged. The pre-nav engagement path 308 is drawn from the nose of the aircraft 114 to intercept the radial flight line path 304. The pre-nav engagement path 308 is displayed on the display device 102 and the autopilot system flies the aircraft 114 along the pre-nav engagement path 204 in heading mode.

With continued reference to FIG. 4, and in embodiments of steps 208 and 210, the flight management system 108 and/or the autopilot system 116 checks whether the aircraft 114 is sufficiently close (based on navigation data from navigation system 104) to intercepting the radial line flight path 304 to engage the navigation mode. When this condition (and possibly further conditions) has been met, the navigation mode is engaged and the aircraft 114 tracks the radial line flight path 304 (step 210). When the navigation mode is engaged, a window 310 of time begins in which a check is performed in a loop, per step 212, as to whether approach mode enabling conditions are satisfied.

With reference to FIG. 5, the approach mode enabling conditions have been determined to be met at a first time point 312 and manual arming of the approach mode has not been received, thereby resulting in performance of steps 214 and 216. In this example, the approach mode enabling conditions include the aircraft 114 being determined to be in alignment with the target runway 350 and being determined to be on the final approach region, thereby fulfilling the first and second example approach mode enabling conditions. At the first time point 312 when the conditions of step 212 are fulfilled, the first timer T1 is started and the first message is displayed per steps 214 and 216. The first timer expires at second time point 316 and expiration thereof is monitored per step 218. During the period of the first timer T1, manual arming of the approach mode is monitored per step 222.

Figure 6:
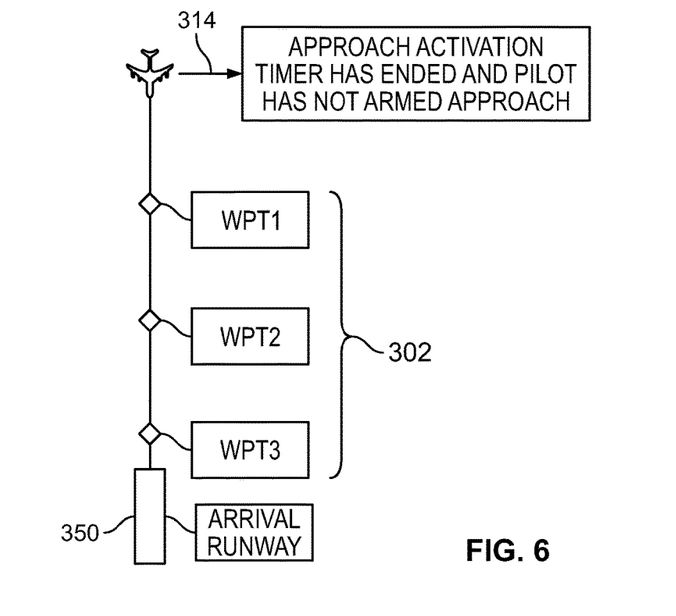
Figure 7:
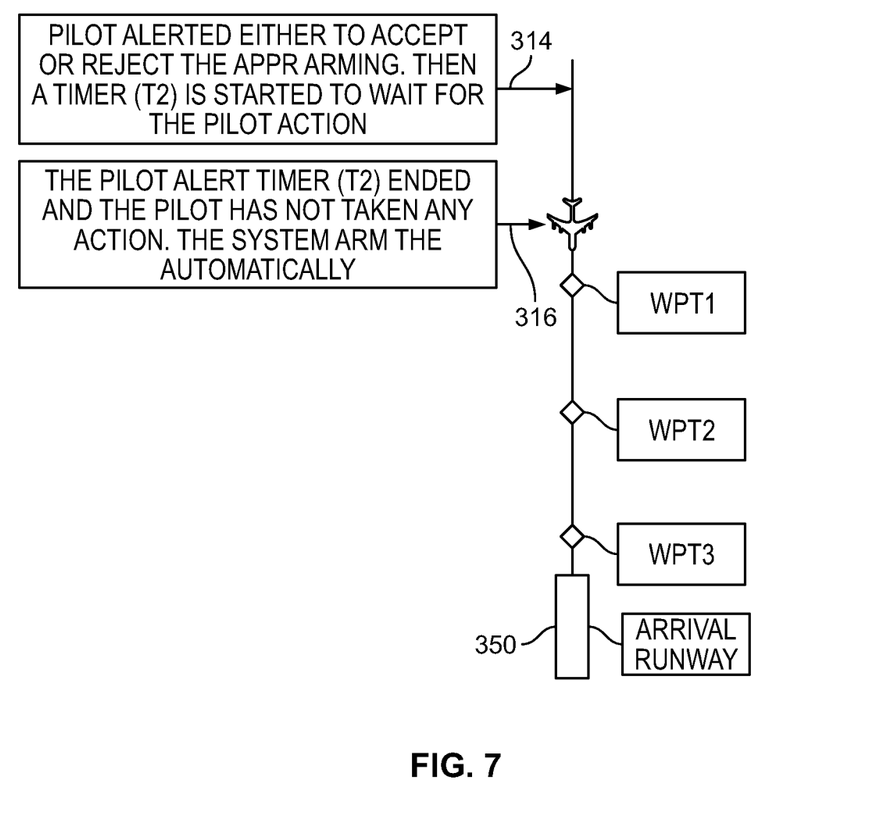

With reference to FIGS. 6 and 7, when the approach mode has still not been armed by the pilot through the user interface 110 by second time point 314 when the first timer is elapsed, a second timer T2 is started (per step 228) and the second message is output (per step 230) at second time point 314. In this example, the first message is an alert via a scratchpad and the second message is a prompt including interactive buttons to accept or reject the arming of the approach mode via MCDU/MFD. During the pre-set period of the second timer T2, manual arming of the approach mode is monitored (per step 232). When the expiration of the second timer T2 has been determined (per step 234) at time point 316 and the approach mode has still not been armed by pressing the accept button associated with the second message, the approach mode is automatically armed (per step 236). Timers T1 and T2 are set so as to expire before the final approach course 302 is started by the aircraft 114.

Accordingly, the present disclosure has provided systems and methods for lessening a chance that a pilot will fail to manually arm the approach mode and for taking preventative action should the approach mode not be timely activated. In this way, aircraft safety during the critical final approach and landing phase can be improved.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

The invention claimed is:

1. An aircraft cockpit system, comprising:
an output system;
a user interface;
an autopilot system;
a navigation system; and
a landing system;
at least one processor in operable communication with the output system, the user interface, the autopilot system, the navigation system, and the landing system, the at least one processor configured to:
receive location data from the navigation system relating at least to aircraft location;
begin to determine, based on the location data from the navigation system, whether conditions have been met enabling arming of an approach mode of the autopilot system when the autopilot system is in a navigation mode tracking radials of a radial line flight path directed to a final approach course, wherein the conditions enabling arming of the approach mode of the autopilot system include a first approach mode enabling condition that an aircraft comprising the aircraft cockpit system is either within a final approach region or on a final approach segment as determined from flight plan data retrieved from a database of the aircraft cockpit system, and wherein the conditions enabling arming of the approach mode of the autopilot system further include a second approach mode enabling condition that the aircraft has a heading aligned to a heading of a target runway or is within a predetermined angle of the heading of the target runway;
when the conditions enabling arming of the approach mode are determined to be met, start at least one timer of at least one period of time and, at the same time, providing at least one message, via the output system, wherein the at least one message provides an alert to arm the approach mode via manual input to the user interface;
determine whether the approach mode has been armed via manual input to the user interface within the at least one period of time; and
when the at least one period of time has expired and a determination is made that the approach mode has still not been armed, automatically arm the approach mode;
wherein the landing system is configured to capture localizer and guide slope system beams when the approach mode is armed, wherein the at least one processor is configured to change the approach mode from armed to engaged based at least on determining that the localizer and guide slope system beams have been captured, and wherein the landing system is configured to provide precision location data to the autopilot system based on the captured localizer and guide slope system beams and the autopilot system is configured to control flying of a final approach course based on the precision location data when the approach mode is engaged.

2. The aircraft cockpit system of claim 1, wherein the at least one processor configured to:
when the one or more conditions enabling arming of the approach mode are determined to be met, start a first timer of a first period of time and, at the same time, provide the first message;
determine whether the approach mode has been armed via manual input to the user interface within the first period of time; and
when the first period of time has expired and a determination is made that the approach mode has still not been armed, start a second timer of a second period of time and, at the same time, provide, via the output system, a second message, different to the first message, to arm the approach mode via manual input to the user interface; and
when the second period of time has expired and a determination has been made that the approach mode continues to have not been armed via manual input to the user interface, automatically arm the approach mode.

3. The aircraft cockpit system of claim 2, wherein the first and second messages are on different display devices of the output system.

4. The aircraft cockpit system of claim 2, wherein the second message includes selectable options to accept or reject automatic arming of the approach mode.

5. The aircraft cockpit system of claim 2, wherein the first message is on a scratchpad of the output system and the second message is on a MCDU/MFD Multi Control Display Unit/Multi function display of the output system.

6. The aircraft cockpit system of claim 1, wherein the at least one processor is configured to generate a radial line flight path based on a selected waypoint of the final approach course and an input angle, the autopilot system configured to engage a heading mode of the autopilot system to intercept the radial line flight path and to arm the navigation mode of the autopilot system and the autopilot system configured to engage the navigation mode to track the radial line flight path when one or more conditions for transitioning from the heading mode to the navigation mode have been determined to be met.

7. The aircraft cockpit system of claim 1, wherein the at least one processor is configured to receive a selection through the user interface to override the automatic approach mode arming and to correspondingly disarm the approach mode of the autopilot system.

8. A method of operating an aircraft, comprising:
receiving, via at least one processor, location data from a navigation system of the aircraft relating at least to aircraft location;
beginning determining, via the at least one processor, based on the location data from the navigation system, whether conditions have been met enabling arming of an approach mode of an autopilot system when the autopilot system is in a navigation mode tracking radials of a radial line flight path directed to a final approach course, wherein the conditions enabling arming of the approach mode of the autopilot system include a first approach mode enabling condition that the aircraft is either within a final approach region or on a final approach segment as determined from flight plan data retrieved from a database of the aircraft, and wherein the conditions enabling arming of the approach mode of the autopilot system further include a second approach mode enabling condition that the aircraft has a heading aligned to a heading of a target runway or is within a predetermined angle of the heading of the target runway;

when the conditions enabling arming of the approach mode are determined to be met, starting, via the at least one processor, at least one timer of at least one period of time and, at the same time, providing at least one message, via an output system, wherein the at least one message provides an alert to arm the approach mode via manual input to a user interface;

determine, via the at least one processor, whether the approach mode has been armed via manual input to the user interface within the at least one period of time;

when the at least one period of time has expired and a determination is made that the approach mode has still not been armed, automatically arming the approach mode;

when the approach mode is armed, capturing, via a landing system, localizer and guide slope system beams;

changing, via the at least one processor, the approach mode from armed to engaged based at least on determining that the localizer and guide slope system beams have been captured, wherein the landing system provides precision location data to the autopilot system based on the captured localizer and guide slope system beams, and controlling, via the autopilot system, flying of a final approach course based on the precision location data when the approach mode is engaged.

9. The method of claim 8, comprising:
when the conditions enabling arming of the approach mode are determined to be met, starting, via the at least one processor, a first timer of a first period of time and, at the same time, providing the first message;

determine whether the approach mode has been armed via manual input to the user interface within the first period of time; and when the first period of time has expired and a determination is made that the approach mode has still not been armed, starting, via the at least one processor, a second timer of a second period of time and, at the same time, providing, via the output system, a second message, different to the first message, to arm the approach mode via manual input to the user interface; and when the second period of time has expired and a determination has been made that the approach mode continues to have not been armed via manual input to the user interface, automatically arming the approach mode.

10. The method of claim 9, wherein the first and second messages are on different display devices of the output system.

11. The method of claim 9, wherein the second message includes selectable options to accept or reject automatic arming of the approach mode.

12. The method of claim 9, wherein the first message is on a scratchpad of the output system and the second message is on a MCDU/MFD Multi Control Display Unit/Multi function display of the output system.

13. The method of claim 8, comprising generating, via at least one processor, a radial line flight path based on a selected waypoint of the final approach course and an input angle, engaging a heading mode of the autopilot system to intercept the radial line flight path and arming the navigation mode of the autopilot system, and engaging the navigation mode to track the radial line flight path when one or more conditions for transitioning from the heading mode to the navigation mode have been determined to be met.

14. The method of claim 8, comprising receiving a selection through the user interface to override the automatic approach mode arming and correspondingly disarming the approach mode of the autopilot system.

* * * * *